United States Patent
Kikuchi et al.

(10) Patent No.: US 10,232,875 B2
(45) Date of Patent: Mar. 19, 2019

(54) MOTOR CONTROL UNIT, FAILURE DETECTING METHOD, AND ELECTRIC POWER STEERING APPARATUS AND VEHICLE EQUIPPED WITH THE SAME

(71) Applicant: NSK LTD., Tokyo (JP)

(72) Inventors: Yusuke Kikuchi, Fujisawa (JP); Gen Kimura, Fujisawa (JP); Zhipeng Tu, Fujisawa (JP)

(73) Assignee: NSK LTD., Tokyo (JP)

( * ) Notice: Subject to any disclaimer, the term of this patent is extended or adjusted under 35 U.S.C. 154(b) by 20 days.

(21) Appl. No.: 15/508,742

(22) PCT Filed: Sep. 1, 2015

(86) PCT No.: PCT/JP2015/074828
§ 371 (c)(1),
(2) Date: Mar. 3, 2017

(87) PCT Pub. No.: WO2016/035783
PCT Pub. Date: Mar. 10, 2016

(65) Prior Publication Data
US 2017/0297616 A1    Oct. 19, 2017

(30) Foreign Application Priority Data

Sep. 4, 2014    (JP) .................................. 2014-180480

(51) Int. Cl.
*B62D 5/04*        (2006.01)
*B62D 6/00*        (2006.01)
(Continued)

(52) U.S. Cl.
CPC ............ *B62D 5/0487* (2013.01); *B62D 5/04* (2013.01); *B62D 5/0463* (2013.01); *B62D 6/00* (2013.01);
(Continued)

(58) Field of Classification Search
CPC ... H02M 7/5395; H02P 27/085; B60L 11/123; B60L 11/14; B60L 14/025
See application file for complete search history.

(56) References Cited

U.S. PATENT DOCUMENTS

| 2009/0150027 A1* | 6/2009 | Takamatsu ........... B62D 5/0457 701/41 |
| 2011/0315470 A1* | 12/2011 | Uryu ................... B62D 5/0484 180/446 |
| 2015/0091484 A1* | 4/2015 | Royak ................ H02M 5/4585 318/400.26 |

FOREIGN PATENT DOCUMENTS

| EP | 2725705 A1 | 4/2014 |
| JP | 1-190281 A | 7/1989 |

(Continued)

OTHER PUBLICATIONS

International Search Report of PCT/JP2015/074828, dated Dec. 1, 2015. [PCT/ISA/210].

(Continued)

*Primary Examiner* — Shawki S Ismail
*Assistant Examiner* — Zoheb Imtiaz
(74) *Attorney, Agent, or Firm* — Sughrue Mion, PLLC

(57) ABSTRACT

A motor control unit is provided that controls a motor with multi-system windings via motor driving circuits on winding systems based on a current command value including current detecting circuits to detect at least two-phase or more currents for each of the multi-system windings of the three-phase motor, three-phase/two-phase converting sections to convert the detected phase currents to two-phase currents for the multi-system windings, and a failure diagnosing section to perform a current-calculation of the two-phase currents converted to two-phase for the multi-system windings, and to perform a diagnosis failure by comparing a difference of current-calculated results between the multi- (Continued)

system windings and an accumulating value of the difference with respective thresholds.

11 Claims, 12 Drawing Sheets

(51) Int. Cl.
*H02P 27/06* (2006.01)
*H02P 29/00* (2016.01)
*H02P 6/16* (2016.01)
*H02P 29/024* (2016.01)

(52) U.S. Cl.
CPC ............... *H02P 6/16* (2013.01); *H02P 27/06* (2013.01); *H02P 29/00* (2013.01); *H02P 29/024* (2013.01)

(56) References Cited

FOREIGN PATENT DOCUMENTS

| | | |
|---|---|---|
| JP | 2004-215390 A | 7/2004 |
| JP | 2009-240125 A | 10/2009 |
| JP | 2013-38950 A | 2/2013 |
| JP | 2014-7880 A | 1/2014 |
| WO | 2012/176553 A1 | 12/2012 |

OTHER PUBLICATIONS

Notice of Allowance of Japanese Patent Application No. 2016-546653, dated Feb. 7, 2017.

* cited by examiner

PRIOR ART

PRIOR ART

BEFORE FAILURE
OCCURRENCE
(NORMAL OPERATING TIME)

PRIMARY FAILURE
OCCURRENCE

SECONDARY FAILURE
OCCURRENCE

PRIOR ART

FIG.11
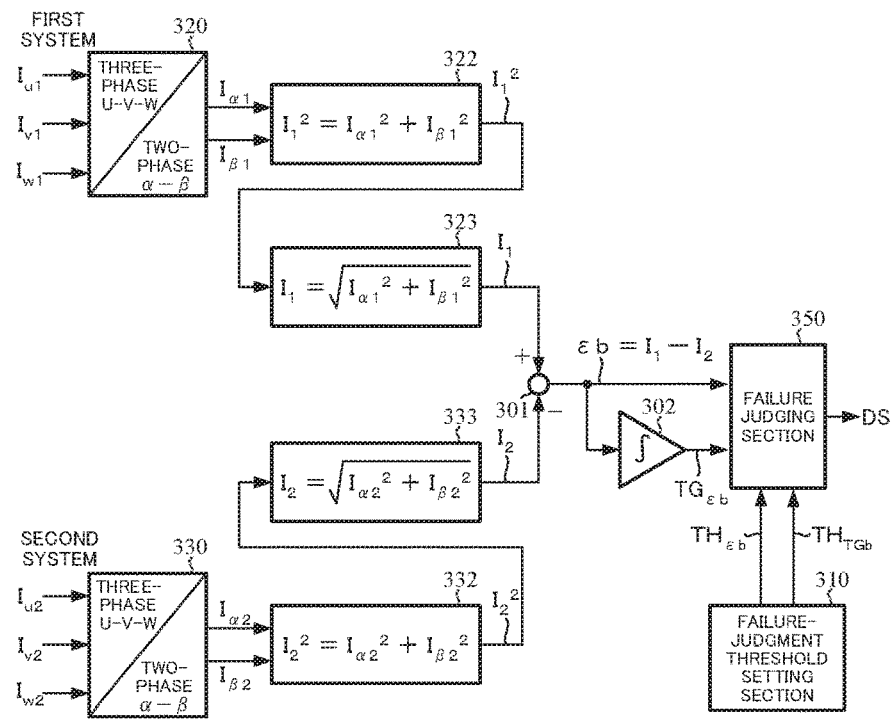
FIG.12A  FIRST SYSTEM CURRENT DETECTION − SECOND SYSTEM CURRENT DETECTION
(SQUARE ROOT OF SQUARE-SUM FOR TWO-PHASE $\alpha - \beta$)
HIGH SPEED STEERING, HIGH ASSIST FORCE
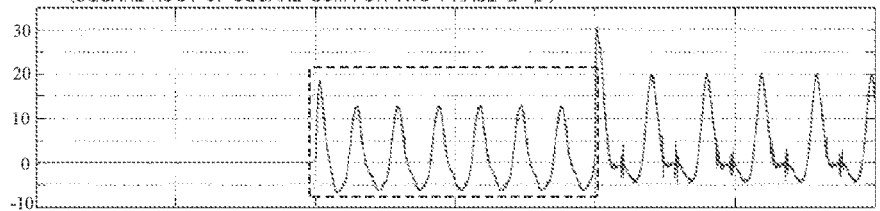
FIG.12B  TIME INTEGRATION OF THE ABOVE DIFFERENCE
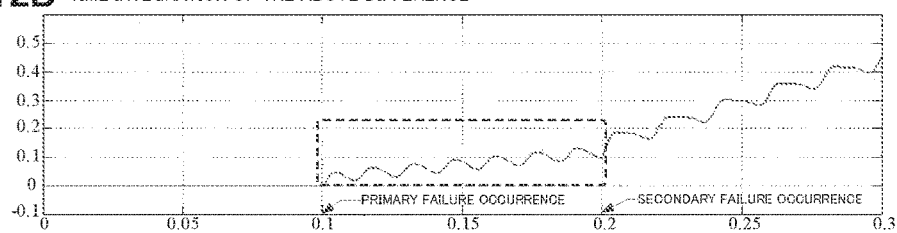

LOW SPEED STEERING, LOW ASSIST FORCE
FIG.13A FIRST SYSTEM CURRENT DETECTION − SECOND SYSTEM CURRENT DETECTION
(SQUARE ROOT OF SQUARE-SUM FOR TWO-PHASE $\alpha-\beta$)
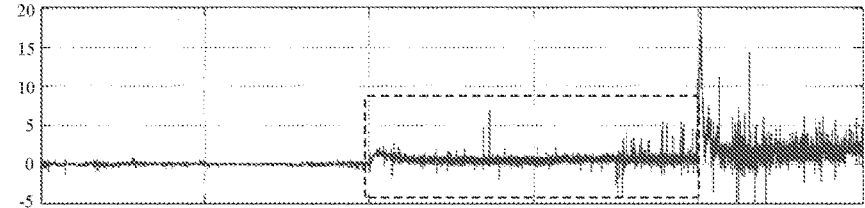
FIG.13B TIME INTEGRATION OF THE ABOVE DIFFERENCE
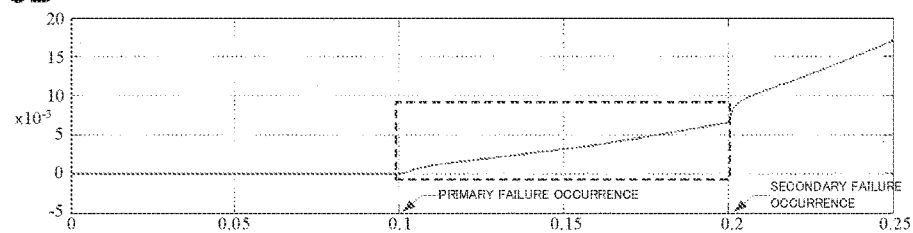
FIG.14
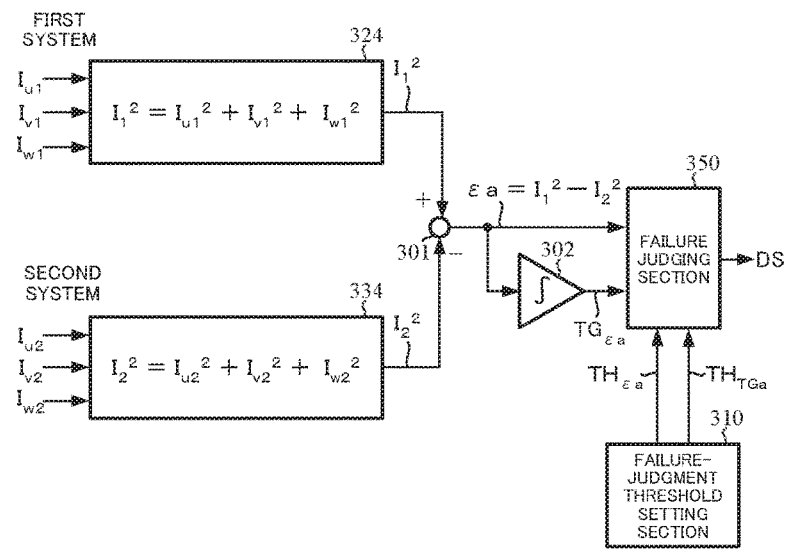

MOTOR CONTROL UNIT, FAILURE DETECTING METHOD, AND ELECTRIC POWER STEERING APPARATUS AND VEHICLE EQUIPPED WITH THE SAME

CROSS REFERENCE TO RELATED APPLICATIONS

This application is a National Stage of International Application No. PCT/JP2015/074828 filed Sep. 1, 2015, claiming priority based on Japanese Patent Application No. 2014-180480, filed Sep. 4, 2014, the contents of all of which are incorporated herein by reference in their entirety.

TECHNICAL FIELD

The present invention relates to a motor control unit that controls a three-phase motor with multi-system motor windings by using a three-phase current feedback method with a current control section via motor driving circuits with respect to each of the winding systems based on a current command value, a failure detecting method, and an electric power steering apparatus and a vehicle equipped with the above motor control unit. Particularly, the present invention relates to the high reliable motor control unit that surely detects and processes a failure of driving circuits for the three-phase motor with the multi-system motor windings, such as an opening failure or a short-circuit failure of switching elements, a disconnection failure or a short-circuit failure of coil windings, or a disconnection failure or a short-circuit failure of other driving circuits, the failure detecting method, and the electric power steering apparatus and the vehicle equipped with the motor control unit. The electric power steering apparatus that is incorporated in the vehicle applies an assist force by means of the motor (for example, three-phase brushless motor) to a steering system of the vehicle due to the calculated current command value based on at least a steering torque, and is driving-controlled by an inverter which is constituted by abridge circuit of power switching elements (for example, FETs).

BACKGROUND ART

An electric power steering apparatus (EPS) serves as an apparatus which is equipped with a motor control unit to control a motor. The electric power steering apparatus which provides a steering mechanism of a vehicle with a steering assist torque (an assist torque) by means of a rotational torque of the motor, applies a driving force of the motor being controlled with an electric power supplied from an inverter to a steering shaft or a rack shaft by means of a transmission mechanism such as gears. In order to accurately generate the steering assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control. A brushless motor, which has an excellent maintenance performance, is generally used as the motor.

A general configuration of the conventional electric power steering apparatus will be described with reference to FIG. 1. As shown in FIG. 1, a column shaft (a steering shaft, a handle shaft) 2 connected to a steering wheel (handle) 1, is connected to steered wheels 8L and 8R through reduction gears in a reduction section 3, universal joints 4a and 4b, a rack and pinion mechanism 5, and tie rods 6a and 6b, further via hub units 7a and 7b. Further, the column shaft 2 are provided with a torque sensor 10 for detecting a steering torque Ts of the steering wheel 1 and a steering angle sensor 14 for detecting a steering angle θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (steering assist) based on a steering torque Ts detected by the torque sensor 10 and a vehicle speed Vs detected by a vehicle speed sensor 12, and controls a current supplied to the motor 20 for EPS based on a voltage control command value Vref obtained by performing compensation and so on with respect to the current command value.

As well, a steering angle sensor 14 is not indispensable and may not be provided. It is possible to obtain the steering angle from a rotational position sensor such as a resolver connected to the motor 20.

A controller area network (CAN) 40 to receive/send various information of the vehicle is connected to the control unit 30, and it is possible to receive the vehicle speed Vs from the CAN 40. Further, it is also possible to connect a non-CAN 41 receiving/sending a communication, analog/digital signals, a radio wave or the like except with the CAN 40 to the control unit 30.

In such an electric power steering apparatus, the control unit 30 mainly comprises a CPU (including an MCU, an MPU, and a microcomputer and so on), and general functions performed by programs within the CPU are, for example, shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31. The current command value calculating section 31 calculates a current command value Iref1, based on the steering torque Ts and the vehicle speed Vs with reference to an assist map or the like, which is a control target value of a current supplied to the motor 20. The calculated current command value Iref1 is inputted into a current limiting section 33 via an adding section 32A, the current command value Irefm that is limited the maximum current in the current limiting section 33, is inputted into a subtracting section 32B. A deviation I (=Irefm−Im) between the current command value Irefm and a motor current value Im which is fed-back is calculated in the subtracting section 32B, and the deviation I is inputted into a PI-control section 35 for improving a current characteristic of the steering operation. The voltage control command value Vref that the characteristic is improved in the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. An FET is used as a driving element in the inverter 37, and the inverter 37 is constituted by a bridge circuit of the FETs.

A compensation signal CM from a compensation signal generating section 34 is added at the adding section 32A. A characteristic compensation of the steering system is performed by adding the compensation signal CM, and then a convergence, an inertia property and so on are improved. The compensation signal generating section 34 adds a self-aligning torque (SAT) 34-3 with an inertia 34-2 at an adding section 34-4, further adds the result of addition performed at the adding section 34-4 with a convergence 34-1 at an adding section 34-5, and then outputs the result of addition performed at the adding section 34-5 as the compensation signal CM.

Even if a motor failure (including an abnormality) occurs in such the electric power steering apparatus, cases that use the motor with multi-system motor windings which has a structure of a continuous motor operation are recently increasing. For example, in the motor with dual-system windings, coils of a stator are divided into two systems (U1 phase to W1 phase and U2 phase to W2 phase). Therefore, even if the failure occurs in one system, the other system can rotate a rotor and successively continue an assist control.

As an example of the motor with multi-system motor windings, a three-phase motor with dual-system motor windings is described with reference to FIGS. 3 and 4.

As shown in FIG. 3, the three-phase motor 200 has a configuration of an SPM (Surface Permanent Magnet) motor that includes a stator 12S having teeth T which are magnetic poles and form slots SL inwardly protruding at an inner periphery, and an eight-pole surface magnet-type rotor 12R which is rotatably disposed opposite to the teeth T at the inner periphery of the stator 12S and are mounted permanent magnets PM on the surface thereof. Here, the number of the teeth T of the stator 12S is set to "phase number×2n" ("n" is an integer which is two or more). For example, in a case of n=2, the motor has a configuration of eight poles and twelve slots.

In the dual-system as shown in FIG. 4, three-phase motor windings L1 of the first system and three-phase motor windings L2 of the second system, which are a poly-phase motor windings that each of the same phase magnetic poles is in phase with the rotor magnets, are wound on the slots SL of the stator 12S. In the three-phase motor windings L1 of the first system, respective one-ends of a U-phase coil L1u, a V-phase coil L1v and a W-phase coil L1w are connected each other so as to form a star-connection. The other ends of the phase coils L1u, L1v and L1w are connected to the motor control unit, and motor driving currents Iu1, Iu1 and Iw1 are individually supplied to the respective coils.

In the phase coils L1u, L1v and L1w, two coil sections Ua1 and Ub1, Va1 and Vb1 and Wa1 and Wb1 are respectively formed. These coil sections Ua1, Va1 and Wa1 are, with concentrated windings, wound on the teeth T1, T2 and T3 which are disposed in a clockwise direction. Further, the coil sections Ub1, Vb1 and Wb1 are, with the concentrated windings, wound on the teeth T7, T8 and T9 which are disposed in the clockwise direction being diagonal to the teeth T1, T2 and T3 with respect to the rotor 12R.

Similarly, in the three-phase motor windings L2 of the second system, respective one-ends of a U-phase coil L2u, a V-phase coil L2v and a W-phase coil L2w are connected each other so as to form the star-connection. The other ends of the phase coils L2u, L2v and L2w are connected to the motor control unit, and motor driving currents Iu2, Iv2 and Iw2 are individually supplied to the respective coils.

In the phase coils L2u, L2v and L2w, two coil sections Ua2 and Ub2, Va2 and Vb2 and Wa2 and Wb2 are respectively formed. These coil sections Ua2, Va2 and Wa2 which are, with the concentrated windings, wound on the teeth T4, T5 and T6 which are disposed in a clockwise direction. Further, the coil sections Ub2, Vb2 and Wb2 are, with the concentrated windings, wound on the teeth T10, T11 and T12 which are disposed in the clockwise direction being diagonal to the teeth T4, T5 and T6 with respect to the rotor 12R.

Then, the coil sections Ua1 and Ub1, Va1 and Vb1 and Wa1 and Wb1 of the phase coils L1u, L1v and L1w, and the coil sections Ua2 and Ub2, Va2 and Vb2 and Wa2 and Wb2 of the phase coils L2u, L2v and L2w are wound on the slots SL which sandwich the respective teeth T so that the current directions are the same direction.

As stated above, the coil sections Ua1 and Ub1, Va1 and Vb1 and Wa1 and Wb1 of the phase coils L1u to L1w which form the three-phase motor windings L1 of the first system, and the coil sections Ua2 and Ub2, Va2 and Vb2 and Wa2 and Wb2 of the phase coils L2u to L2w which form the three-phase motor windings L2 of the second system are wound on the twelve teeth T which are different each other. That is, on the twelve teeth T, the phase coils Ua1, Va1 and Wa1 which form one of the first system are sequentially wound with the same winding direction in the clockwise direction, next the phase coils Ua2, Va2 and Wa2 which form one of the second system are sequentially wound with the same winding direction in the clockwise direction, further the phase coils Ub1, Vb1 and Wb1 which form the other of the first system are sequentially wound with the same winding direction in the clockwise direction, and finally the phase coils Ub2, Vb2 and Wb2 which form the other of the second system are sequentially wound with the same winding direction in the clockwise direction. Consequently, the coil sections for the same phase of the motor windings L1 of the first system and the motor windings L2 of the second system are wound so as not to interlink at the same time to the same magnetic flux formed due to the magnetic poles of the permanent magnets PM for the rotor 12R. Therefore, the coil sections of the three-phase motor windings L1 of the first system and the coil sections of the three-phase motor windings L2 of the second system form a magnetic circuit to suppress a magnetic interference in minimum.

In the motor control unit with the motor having the above multi-system motor windings, the motor winding is a wiring as shown in FIG. 5A at a normal operating time. However, when a primary failure (for example, a short-circuit failure of the winding) occurs, the wiring becomes to FIG. 5B, and when a secondary failure (for example, short-circuit failures of the two windings), the wirings become to FIG. 5C. Although FIGS. 5A to 5C show a case of the U-phase of the first system, the failure of other phases of other system is similarly capable of applying.

Countermeasure means to detect the failure of the above motor winding or the inverter is disclosed, for example, in Japanese Unexamined Patent Publication No. 2013-38950 A (Patent Document 1). That is, the apparatus disclosed in Patent Document 1 is to detect the failure of the inverter or the winding pair by using only the detected phase current value, and two failure judging means calculate a phase current estimating value of the own system based on a detected three-phase current value of the other system each other and detect the failure of the inverter or the winding pair by comparing the detected current value and the phase current estimating value.

THE LIST OF PRIOR ART DOCUMENTS

Patent Documents

Patent Document 1: Japanese Unexamined Patent Publication No. 2013-38950 A

SUMMARY OF THE INVENTION

Problems to be Solved by the Invention

However, the apparatus disclosed in Patent Document 1 calculates the phase current estimating value of the own system based on the detected three-phase current value of the other system and compares the phase current estimating value with the detected current value, and the phase current estimating value is a voltage command value on dq-axes rotational coordinate. Therefore, when a current variation is small due to a degree of the failure, there is a possibility not to detect the failure. Further, in the apparatus of Patent Document 1, a d-axis voltage Vd and a q-axis voltage Vq and a d-axis current Id and a q-axis current Iq on the dq-axes rotational coordinate, are detected and compared, individually. Accordingly, when the voltage or the current occurred due to the failure is small, the voltages (Vd, Vq) or the currents (Id, Iq) are buried with a noise due to a PWM-operation or an offset of a current sensor, and there is a possibility not to detect the voltage or the current causing the failure.

The present invention has been developed in view of the above-described circumstances, and an object of the present invention is to provide the high reliable motor control unit that surely detects and processes a failure of driving circuits for a three-phase motor with multi-system motor windings, such as an opening failure or a short-circuit failure of switching elements, a disconnection failure or a short-circuit failure of coil windings, or a disconnection failure or a short-circuit failure of other driving circuits by comparing a current command value and a detected current value on a coordinate system at rest to and by using, as a judging value, an accumulated value of errors for detecting the failure (including an abnormality), the failure detecting method, and the electric power steering apparatus and the vehicle equipped with the motor control unit.

Means for Solving the Problems

The present invention relates to a motor control unit that controls a three-phase motor with multi-system motor windings via motor driving circuits for respective winding systems based on a current command value, the above-described object of the present invention is achieved by that comprising: current detecting circuits to detect at least two-phase or more currents for respective the multi-system motor windings of the three-phase motor, three-phase/two-phase converting sections to convert the detected phase currents to two-phase currents for respective the multi-system motor windings, and a failure diagnosing section to perform a current-calculation of the two-phase currents converted to two-phases for respective the multi-system motor windings, and to perform a failure diagnosis by respectively comparing a difference of current-calculated results between the multi-system motor windings and an accumulated value of the difference with respective failure-judgment thresholds; or current detecting circuits to detect at least two-phase or more currents for respective the multi-system motor windings of the three-phase motor, and a failure diagnosing section to perform a current-calculation of the three-phase currents for respective the multi-system motor windings, and to perform a failure diagnosis by respectively comparing a difference of current-calculated results between the multi-system motor windings and an accumulated value of the difference with respective failure-judgment thresholds.

Further, the present invention relates to a failure detecting method for detecting a failure in each of systems that a motor winding is constituted with multi-system motor windings and driving circuits are respectively connected to multi-systems, comprising the steps of: detecting three-phase currents ($I_{un}$, $I_{vn}$, $I_{wn}$, n=1, 2, 3, ...) of the multi-systems, calculating a square-sum ($I_n^2 = I_{un}^2 + I_{vn}^2 + I_{wn}^2$) for the three-phase currents, judging that a difference ($\varepsilon_d = I_n^2 - I_m^2$) of square-sums $I_n^2$ and $I_m^2$ (n, m=1, 2, 3, ..., where n≠m) for respective the multi-systems reaches at a threshold ($\varepsilon_{dref}$) which is determined based on a current command value of the motor, and detecting a failure-occurrence in respective the multi-systems; or detecting three-phase currents ($I_{un}$, $I_{vn}$, $I_{wn}$, n=1, 2, 3, ...) of the multi-systems, calculating a square root ($I_n = \sqrt{(I_{un}^2 + I_{vn}^2 + I_{wn}^2)}$) of a square-sum ($I_n^2 = I_{un}^2 + I_{vn}^2 + I_{wn}^2$) for the three-phase currents, judging that a difference ($\varepsilon'_d = I_n - I_m$) of square roots $I_n$ and $I_m$ (n, m=1, 2, 3, ..., where n≠m) of square-sums for respective the multi-systems reaches at a threshold ($\varepsilon'_{dref}$) which is determined based on a current command value of the motor, and detecting a failure-occurrence in respective the multi-systems; or detecting UVW three-phase currents ($I_{un}$, $I_{vn}$, $I_{wn}$, n=1, 2, 3, ...) of the multi-systems, comparing a U-phase difference ($\varepsilon_{du} = I_{un} - I_{um}$), a V-phase difference ($\varepsilon_{dv} = I_{vn} - I_{vm}$), and a W-phase difference ($\varepsilon_{dw} = I_{wn} - I_{wm}$) (where n≠m) of three-phase currents in respective the multi-systems, judging that each of the differences reaches at a threshold ($\varepsilon_{dc}$) which is determined based on a current command value of the motor, and detecting a failure-occurrence in respective the multi-systems.

The detection of the currents may be calculated by the square-sum (for example, $I_n^2 = I_{un}^2 + I_{vn}^2$) of at least two phases among the three-phase currents ($I_{un}$, $I_{vn}$, $I_{wn}$, n=1, 2, 3, ...). Arbitrary two phases may be used by calculating the square-sum of the phase currents.

Furthermore, the above object of the present invention is accomplished by a motor control unit that: wherein in a case of judging that a continuous driving is capable when a failure occurs, the motor control unit transmits the failure-occurrence to a superior system (or a superior controller) and continues driving with the multi-systems which includes a failed system; or wherein at a time when a failure occurs, the motor control unit transmits the failure-occurrence to a superior system (or a superior controller), stops the driving of a system which the failure occurs, and continues the driving with only normal systems which the failure does not occur; or wherein at a time when the failure occurs, the motor control unit transmits the failure which is over an operable region of a system to a superior system (or a superior controller), and stops driving of all systems. The above object of the present invention is also accomplished by an electric power steering apparatus equipped with any of the above motor control unit or a vehicle equipped with the above electric power steering apparatus.

Effects of the Invention

The motor control unit according to the present invention comprises current detecting circuits to detect phase currents for each of the multi-system windings of the three-phase motor, three-phase/two-phase converting sections to convert the phase currents to two-phase currents for each of the multi-system motor windings, and a failure diagnosing section to diagnose a failure by performing a current-calculation of the two-phase currents for each of the multi-system motor windings and comparing a difference of the current-calculated results between the multi-system motor windings and an accumulated (time integration) value of the difference with respective failure-judgment thresholds, or comprises current detecting circuits to detect phase currents for each of the multi-system motor windings of the three-phase motor, and a failure diagnosing section to diagnose a failure by performing a current-calculation of the three-phase currents for each of the multi-system motor windings by comparing a difference of the current-calculated results between the multi-system motor windings and an accumulated value of the difference with respective failure-judgment thresholds, wherein the motor control unit compares the current command value with the detected current value on the coordinate system at rest, and also uses the accumulated value of the errors as the judging value of the failure (including the abnormality).

According to the failure detecting method of the present invention, it is possible to surely detect the failure such as the opening failure or the short-circuit failure of the switching elements (FETs) of the motor driving circuit for the motor with the multi-system motor windings, the disconnection failure or the short-circuit failure of the coil windings, or the disconnection failure or the short-circuit failure of other driving circuits. In a case of detecting the failure, it is possible to continue the operations with the normal systems by blocking a failed system.

It is capable of improving the reliability by applying the motor control unit and the failure diagnosing section to the electric power steering apparatus, and therefore the vehicle equipped with the electric power steering apparatus can lead to an improvement in reliability of the vehicle.

BRIEF DESCRIPTION OF THE DRAWINGS

In the accompanying drawings:

FIG. 11 is a block diagram showing a structure example (the fourth embodiment) of the motor control unit according to the present invention;

FIGS. 12A and 12B are timing-charts showing an operating example (low speed steering) of the present invention;

FIGS. 13A and 13B are timing-charts showing an operating example (high speed steering) of the present invention;

FIG. 14 is a block diagram showing a structure example (the fifth embodiment) of the motor control unit according to the present invention;

MODE FOR CARRYING OUT THE INVENTION

Figure 1:
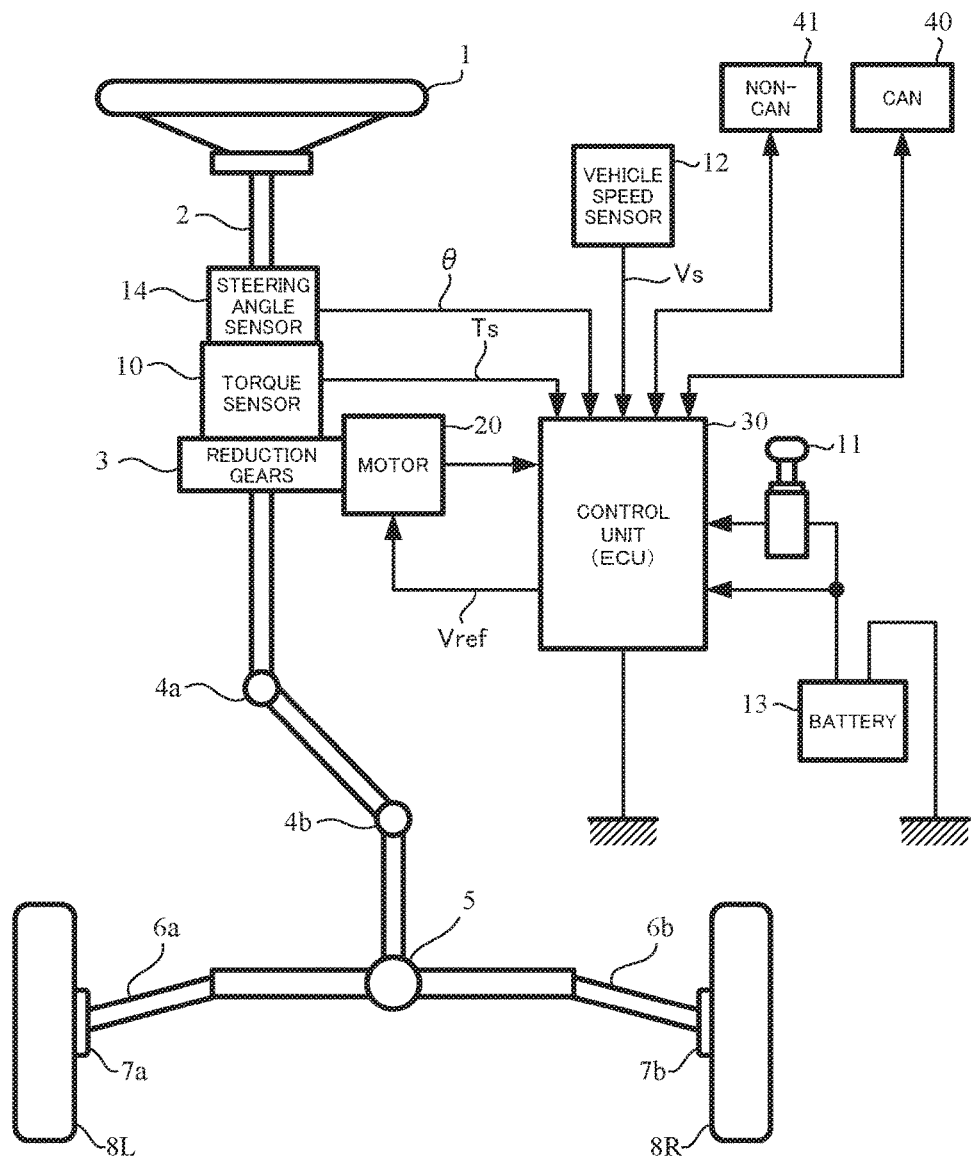
FIG. 1 is a configuration diagram illustrating a general outline of an electric power steering apparatus.
Figure 2:
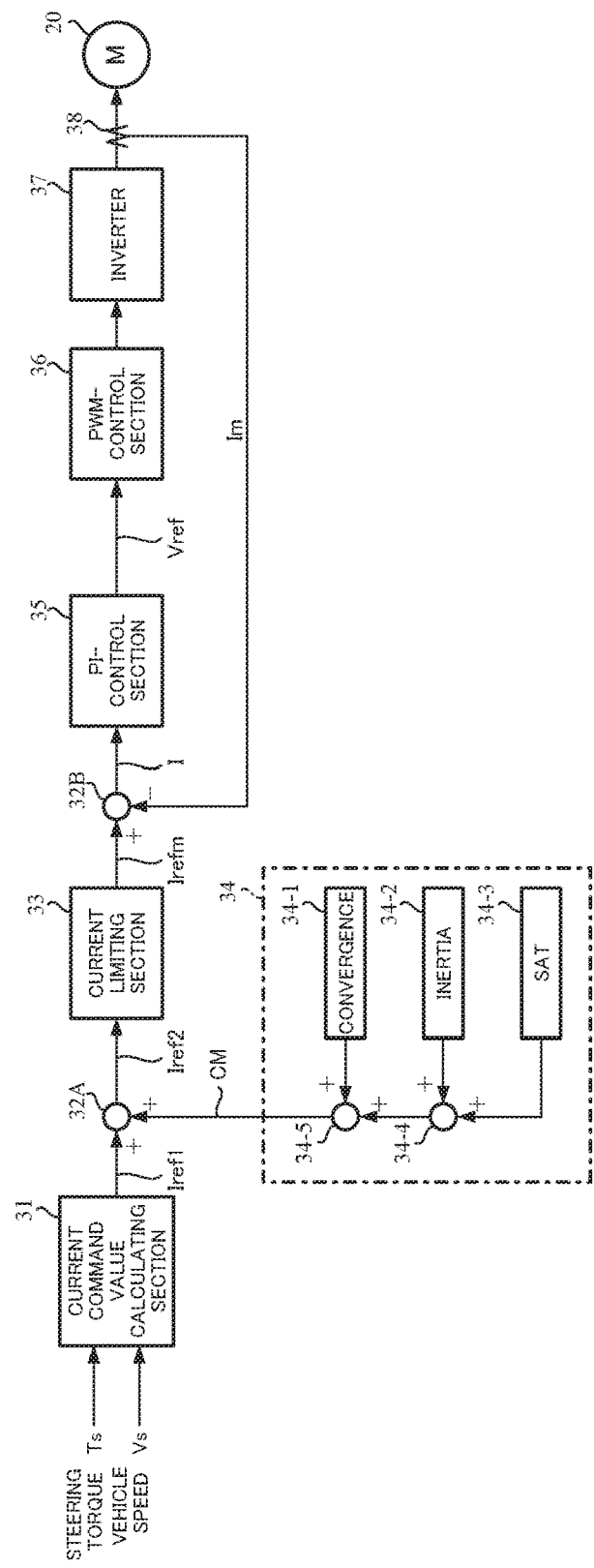
FIG. 2 is a block diagram showing a structure example of a control unit (ECU) of the electric power steering apparatus.
Figure 3:
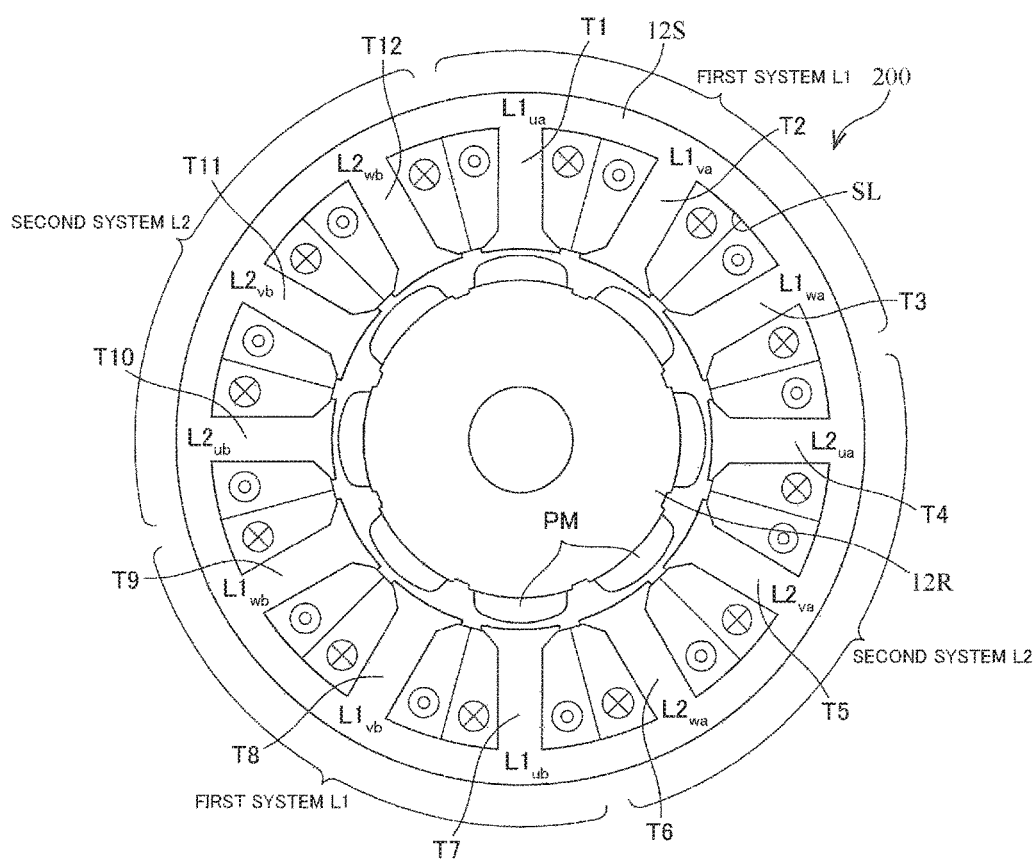
FIG. 3 is across-sectional view showing a structure example of a multi-system motor.
Figure 4:
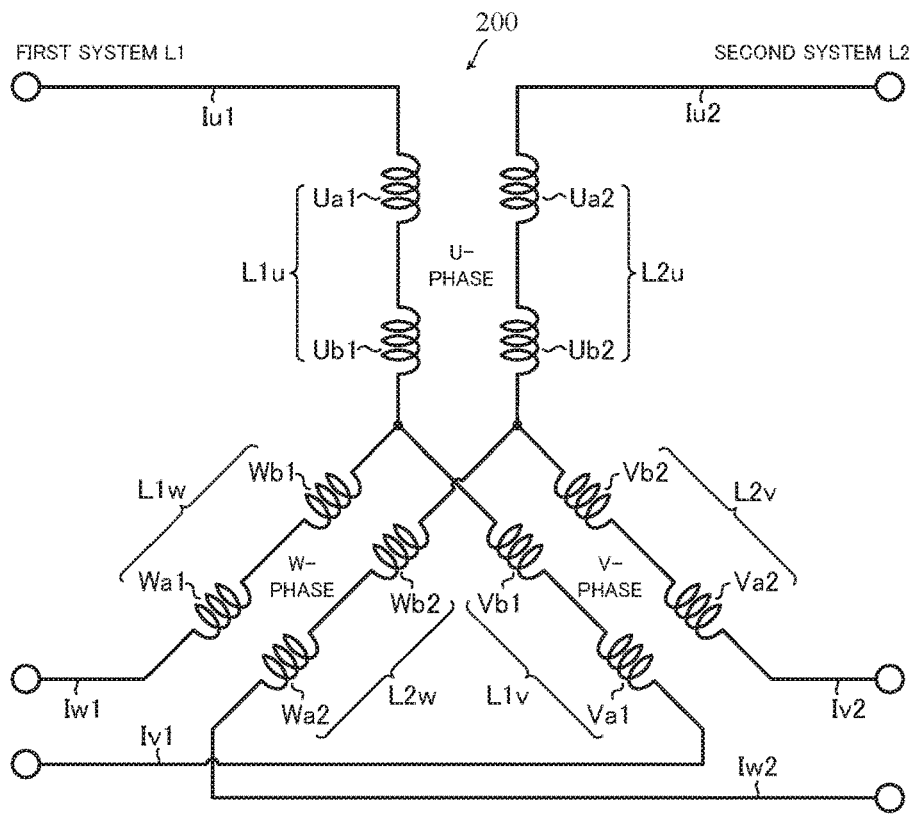
FIG. 4 is a schematic view showing a winding structure of the multi-system motor.
Figure 5A:
FIGS 5A, 5B, and 5C are schematic views showing connection state examples with respect to one phase (U-phase) of a motor coil in normal operating time, in occurring a primary failure, and in occurring a secondary failure, respectively.
Figure 5B:
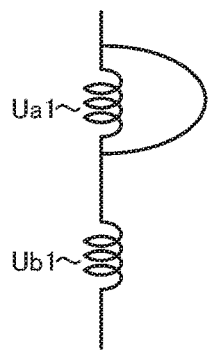
Figure 5C:
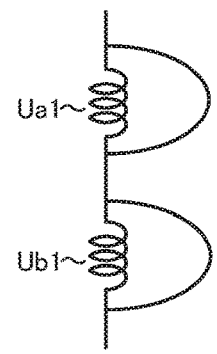

A motor control unit according to the present invention comprises current detecting circuits to detect phase currents for each of multi-system windings of a three-phase motor, three-phase/two-phase converting sections to convert the phase currents to two-phase currents (a coordinate system at rest of α and β) for each of the multi-system motor windings, and a failure diagnosing section to diagnose a failure by performing a current-calculation of the two-phase currents for each of the multi-system motor windings and comparing a difference of the current-calculated results between the multi-system motor windings and an accumulated (time integration) value of the difference with respective failure-judgment thresholds. Or, the motor control unit comprises current detecting circuits to detect phase currents for each of the multi-system motor windings of the three-phase motor, and a failure diagnosing section to diagnose a failure by performing a current-calculation of the three-phase currents for each of the multi-system motor windings by comparing a difference of the current-calculated results between the multi-system motor windings and an accumulated value of the difference with respective failure-judgment thresholds.

In this way, it is possible to surely detect the failure (including an abnormality) such as an opening failure or a short-circuit failure of switching elements of motor driving circuits with the multi-system motor windings, a disconnection failure or a short-circuit failure of a coil winding, or a disconnection failure or a short-circuit failure of other driving circuits.

In a system that a motor winding is constituted with multi-system and driving circuits are connected for respective systems, a failure detecting method of the present invention in the failure diagnosing section detects the failure as a method for detecting the failure in a certain system, for example, an opening failure or a short-circuit failure of switching elements constituting the motor driving circuits, a disconnection failure or the short-circuit failure of the motor windings or bus bar. That is, the present invention detects the three-phase currents ($I_{un}$, $I_{vn}$, $I_{wn}$, n=1, 2, 3, . . . ) of the multi-systems, calculates a square-sum $I_n^2 = I_{un}^2 + I_{vn}^2 + I_{wn}^2$ of the three-phase currents, compares a difference $\varepsilon_d = I_n^2 - I_m^2$ of the square-sums $I_n^2$ and $I_m^2$ (n, m=1, 2, 3, . . . , where n≠m) for each of the systems or a time integral $\varepsilon_i = \int (\varepsilon_d) dt$ of the difference $\varepsilon_d$ with thresholds $\varepsilon_{dref}$ or $\varepsilon_{iref}$ which are determined based on a current command value of the motor, and detects the failure occurred in each of the systems. Or, the present invention converts the three-phase currents to two-phase currents, calculates a square-sum of the two-phase currents, and detects the failure by comparing a difference of the square-sums of the two-phase currents or a difference of square roots with thresholds.

Conventionally, it is difficult to detect the failure in a case that a current variation due to the failure is small. However, since the present invention calculates the square-sums $I_1^2 = I_{u1}^2 + I_{v1}^2 + I_{w1}^2$, $I_2^2 = I_{u2}^2 + I_{v2}^2 + I_{w2}^2$ of the three-phase currents, or the square-sum $I_1^2 = I_\alpha^2 + I_\beta^2$ of the two-phase currents which are converted from three-phase to two-phase, or the square-sum of currents of at least two or more phases (arbitrary two phases) in three phases, and the difference $\varepsilon_d = I_1^2 - I_2^2$ of the square-sums $I_1^2$ and $I_2^2$ for each of the systems and in addition the time integral $\varepsilon = \int (\varepsilon_d) dt$ of the difference $\varepsilon_d$ as judging factors, it is possible to detect the failure in the operating region that the current variation due to the failure is small. A coordinate system of the detecting failure in Patent Document 1 is a dq-axis rotational coordinate system, and contrary that of the present invention is a UVW-coordinate system at rest. Further, physical quantities of the detecting failure in Patent Document 1 are a voltage command value and a detected current value on the dq-axis rotational coordinate system, and contrary those of the present invention are a current command value and a detected current value on the UVW-coordinate system at rest.

As well, the above exponent may be a natural number which is two or more. In this case, because a difference between a normal operating time and a failure occurrence time is larger than that of in a case of the square, a failure detecting sensitivity can be improved.

As kinds of the current calculation, there are an addition or a subtraction of the two-phase currents, the square-sum of the two-phase currents, and a square root of the square-sum for the two-phase currents. The failure detection is transmitted to a superior system or a superior controller, the driving of the failure system is switched-OFF, and only the normal systems are driven. Alternatively, a difference in a continuous driving capable value is judged, a quantity of the difference is transmitted to the superior system or the superior controller, and the driving with the multi-systems including a failure system is successively continued.

Figure 6:
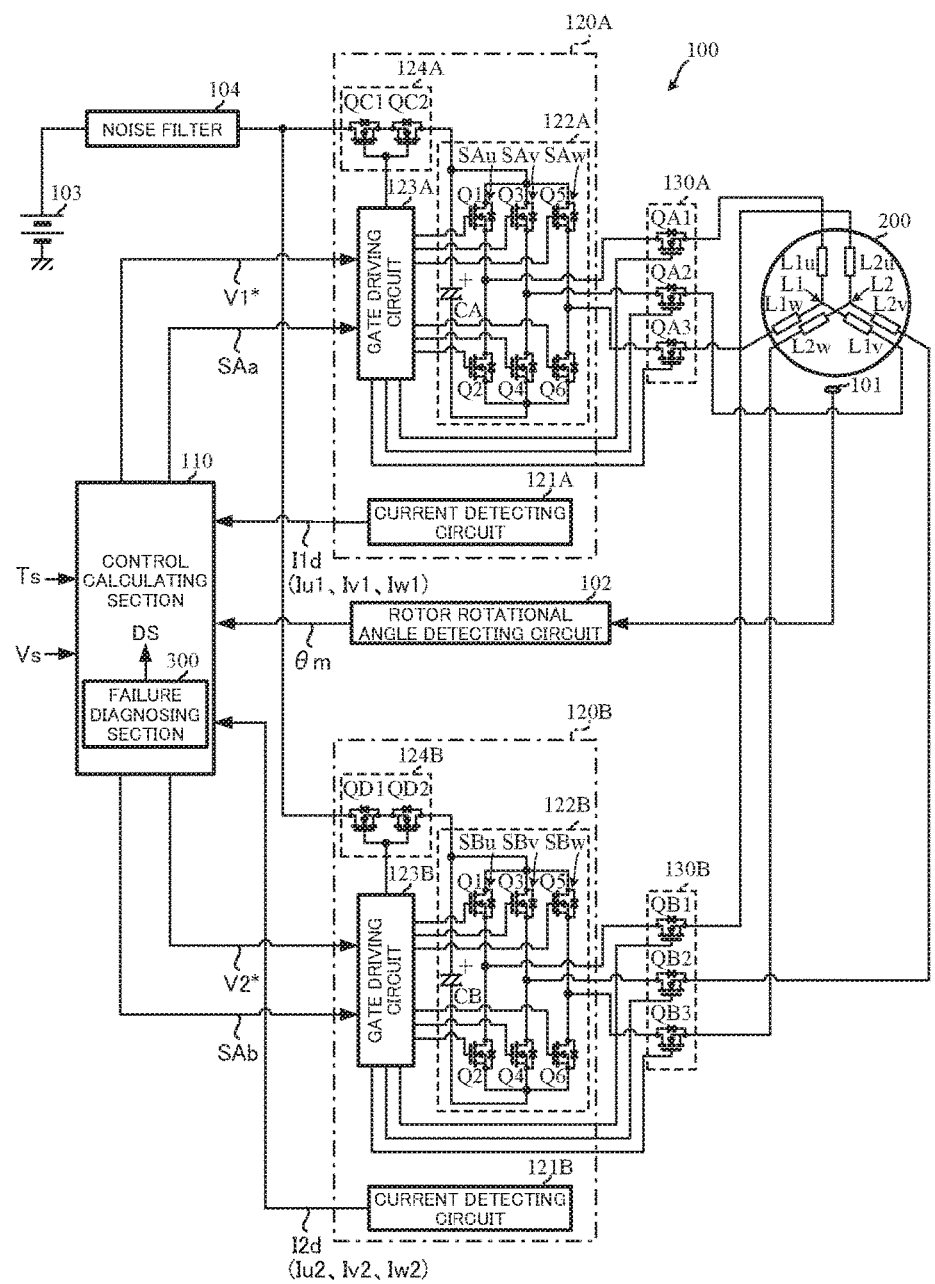
FIG. 6 is a block diagram showing a structure example of the motor control unit of the present invention.

An example of the motor control unit that includes such a failure diagnosing section is described with reference to FIG. 6.

A motor control unit 100 that drives a motor 200 with dual-system motor windings includes a failure diagnosing section 300, and comprises a control calculating section (equivalent to an ECU) 110 which performs compensation, controlling and so on by calculating a current command value to drive the motor 200, motor driving circuits 120A and 120B to respectively input voltage command values V1* and V2* outputted from the control calculating section 110, and motor current shut-off circuits 130A and 130B which are disposed between output-sides of the motor driving circuits 120A and 120B and a first-system motor winding L1 and a second system motor winding L2 of the three-phase motor 200.

The three-phase motor 200 includes a rotational position sensor 101 such as a resolver, an MR device, a rotary encoder, or a Hall device to detect a rotational position of a rotor, a detected value from the rotational position sensor 101 is inputted into a rotor rotational angle detecting circuit 102, and a rotor rotational angle θm is detected by the rotor rotational angle detecting circuit 102. A steering torque Ts detected by the torque sensor 10, a vehicle speed Vs detected by the vehicle speed sensor 12, and the rotor rotational angle θm detected by the rotor rotational angle detecting circuit 102 are inputted into the control calculating section 110 in the motor control unit 100. Further, motor currents I1d (Iu1, Iv1, Iw1) and I2d (Iu2, Iv2, Iw2) which are outputted from respective phase coils of the first-system motor windings L1 and the second-system motor windings L2 of the motor 200 which are respectively outputted from the current detecting circuits 121A and 121B in the motor driving circuits 120A and 120B, are inputted into the control calculating section 110. Further, a direct current is supplied from a battery 103 as a DC power supply to the motor driving circuits 120A and 120B via a noise filter 104.

In the control calculating section 110, the current command values (I1* and I2*) are calculated with reference to a predetermined map A based on the steering torque Ts and the vehicle speed Vs when the motor driving circuits 120A and 120B operates in normal. Alternatively, the current command values (I1* and I2*) are calculated with reference to a predetermined map B based on the steering torque Ts and the vehicle speed Vs when the failure occurs in the motor driving circuits 120A and 120B.

Further, in the control calculating section 110, a d-axis current command value (Id*) and a q-axis current command value (Iq*) of dq-axes coordinate system for a vector control are calculated based on the calculated current command values (I1* and I2*) and the rotor rotational angle em, the calculated d-axis current command value (Id*) and the calculated q-axis current command value (Iq*) are two-phase/three-phase-converted in accordance with the rotor rotational angle em, and then a U-phase current command value (Iu*), a V-phase current command value (Iv*), and a W-phase current command value (Iw*) are obtained. Then, current deviations (ΔIu, ΔIv, and ΔIw) for each of phases of the current detecting values I1d (Iu1, Iv1, and Iw1) and I2d (Iu2, Iv2, and Iw2) which are respectively detected by the current detecting circuits 121A and 121B, are calculated. The PI-control calculations or the like are performed for the current deviations (ΔIu, ΔIv, and ΔIw), and then three-phase voltage command values V1* and V2* to the motor driving circuits 120A and 120B are calculated. The calculated three-phase voltage command values V1* and V2* are inputted into the motor driving circuits 120A and 120B.

The motor driving circuits 120A and 120B respectively include gate driving circuits 123A and 123B that generate gate signals by inputting the three-phase voltage command values V1* and V2* outputted from the control calculating section 110 and serve as current control sections at a failure occurrence time, and inverters 122A and 122B to input the gate signals outputted from the gate driving circuits 123A and 123B.

When the voltage command values V1* and V2* are inputted from the control calculating section 110, the respective gate driving circuits 123A and 123B generate six PWM-signals based on the voltage command values V1* and V2* and a carrier signal of a triangular wave, and then these PWM-signals are inputted into the inverters 122A and 122B.

Further, at the normal state when an abnormal judging signal SAa is not inputted into the gate driving circuit 123A from the control calculating section 110, the gate driving circuit 123A outputs three "H" gate signals to a motor current shut-off circuit 130A and switches-ON the motor current shut-off circuit 130A, and outputs two "H" gate signals to a power supply shut-off circuit 124A and switches-ON the power supply shut-off circuit 124A. On the contrary, at the abnormal state when the abnormal judging signal SAa is inputted into the gate driving circuit 123A from the control calculating section 110, the gate driving circuit 123A outputs three "L" gate signals to the motor current shut-off circuit 130A at the same time and shuts off the motor currents, and outputs two "L" gate signals to the power supply shut-off circuit 124A at the same time and shuts-off a supply of a battery power.

Similarly, at the normal state when the abnormal judging signal SAb is not inputted into the gate driving circuit 123B from the control calculating section 110, the gate driving circuit 123B outputs three "H" gate signals to a motor current shut-off circuit 130B and switches-ON the motor current shut-off circuit 130B, and outputs two "H" gate signals to a power supply shut-off circuit 124B and switches-ON the power supply shut-off circuit 124B. On the contrary, at the abnormal state when the abnormal judging signal SAb is inputted into the gate driving circuit 123B from the control calculating section 110, the gate driving circuit 123B outputs three "L" gate signals to the motor current shut-off circuit 130B at the same time and shuts off the motor currents, and outputs two "L" gate signals to the power supply shut-off circuit 124B at the same time and shuts off the supply of the battery power.

Battery currents from the battery 103 are supplied to the inverters 122A and 122B via the noise filter 104 and the power supply shut-off circuits 124A and 124B, and electrolytic capacitors CA and CB for smoothing are respectively connected between the both ends of the inverters 122A and 122B.

The inverters 122A and 122B include FETs Q1 to Q6 as switching elements, and have a bridge configuration connected in parallel three switching arms SAu, SAv and SAw which are connected in series with two FETs. A U-phase current Iu, a V-phase current Iv and a W-phase current Iw are supplied from the FETs of the switching arms SAu, SAv and SAw therebetween to the first system winding L1 and the second system winding L2 of the motor 200 via the motor current shut-off circuits 130A and 130B by inputting the gate signals from the gate driving circuits 123A and 123B to the FETs Q1 to Q6.

The motor current shut-off circuit 130A includes FETs QA1, QA2 and QA3 for the current shut-off, and the motor current shut-off circuit 130B includes FETs QB1, QB2 and QB3 for the current shut-off. The FETs QA1 to QA3 of the motor current shut-off circuit 130A and the FETs QB1 to QB3 of the motor current shut-off circuit 130B are connected to respective parasitic diodes whose cathodes are disposed at the inverters 122A and 122B sides in the same direction.

The power supply shut-off circuits 124A and 124B respectively have a series circuit configuration that the two FETs QC1 and QC2, and QD1 and QD2 are disposed such that sources are connected each other and parasitic diodes are provided in an opposite direction. Drains of the FET QC1 and the FET QD1 are connected each other and are also connected to the output-side of the noise filter 104, and drains of the FETs QC2 and QD2 are connected to sources of the FETs Q1, Q2 and Q3 of the inverters 122A and 122B.

Figure 7:
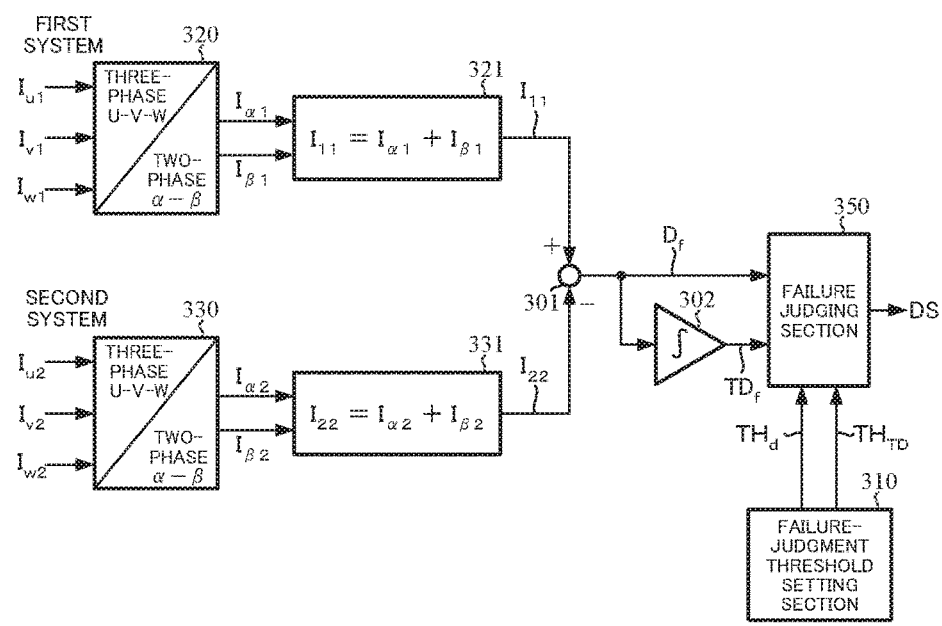
FIG. 7 is a block diagram showing a structure example (the first embodiment) of a failure diagnosing section according to the present invention.

In such the motor control unit 100, the failure diagnosing section 300 in the control calculating section 110 has a configuration (the first embodiment) as shown in, for example, FIG. 7.

The phase currents Iu1, Iv1 and Iw1 of the first system windings L1 of the motor 200 which are detected by the current detecting circuit 121A are inputted into a three-phase/two-phase converting section 320, and the phase currents Iu2, Iv2 and Iw2 of the second system windings L2 of the motor 200 which are detected by the current detecting circuit 121B are inputted into a three-phase/two-phase converting section 330. Currents $I_{\alpha 1}$ and $I_{\beta 1}$ that are converted to two-phase currents of a α-β coordinate system at rest, which are orthogonal each other, at the three-phase/two-phase converting section 320 are adding-inputted into a current calculating section 321, and similarly currents $I_{\alpha 2}$ and $I_{\beta 2}$ that are converted to two-phase currents of the α-β coordinate system at rest, which are orthogonal each other, at the three-phase/two-phase converting section 330 are adding-inputted into the current calculating section 331. A current $I_{11}$ ($=I_{\alpha 1}+I_{\beta 1}$) which is adding-calculated at the current calculating section 321 is adding-inputted into a subtracting section 301, and a current $I_{22}$ ($=I_{\alpha 2}+I_{\beta 2}$) which is adding-calculated at the current calculating section 331 is subtracting-inputted into the subtracting section 301.

A subtracted value $D_f$ ($=I_{11}-I_{22}$) which is obtained at the subtracting section 301 is inputted into a failure judging section 350 and an accumulating section 302, and an accumulated (time integral) value $TD_f$ of the accumulating section 302 is inputted into a failure judging section 350. Failure-judgment thresholds $TH_d$ and $TH_{TD}$ from a failure-judgment threshold setting section 310 are inputted into the failure judging section 350. The failure-judgment threshold $TH_d$ is related to the subtracted value $D_f$, and the failure judging section 350 judges the failure and outputs a failure detecting signal DS when the subtracted value $D_f$ which is the difference between the first system and the second system is the failure-judgment threshold $TH_d$ or more, in a case that a steering speed is high (a motor rotational speed is high) or an assist force is large (a motor phase current is large). On the contrary, the failure-judgment threshold $TH_{TD}$ is related to the accumulated value $TD_f$, and the failure judging section 350 judges the failure and outputs a failure detecting signal DS when the accumulated (time integral) value $TD_f$ which accumulates the difference between the first system and the second system is the failure-judgment threshold $TH_{TD}$ or more, in a case that the steering speed is low (the motor rotational speed is low) or the assist force is small (the motor phase current is small).

The failure-judgment thresholds $TH_d$ and $TH_{TD}$ are determined based on the current command value of the motor 200.

In a case of detecting the failure, the failure judging section 350 transmits the failure occurrence to the superior system or the superior controller by using the failure detecting signal DS, and then the driving of the failed system is switched-OFF and only the normal system side is driven. For example, in a case that the first system is failed, the abnormal judging signal SAa is inputted into the gate driving circuit 123A, the gate driving circuit 123A switches-OFF the power supply shut-off circuit 124A, and thereafter an assist-control is continued by using the second system. Further, the failure judging section 350 compares the difference between each of the systems of the motor windings or the accumulated value of the difference with the failure-judgment thresholds. As a result, in a case that each of the differences is within the continuous driving capable value, the failure judging section 350 transmits the failure occurrence to the superior system or the superior controller by using the failure detecting signal DS, and enables to successively continue the driving with the multi-systems which includes the failed system.

Figure 8:
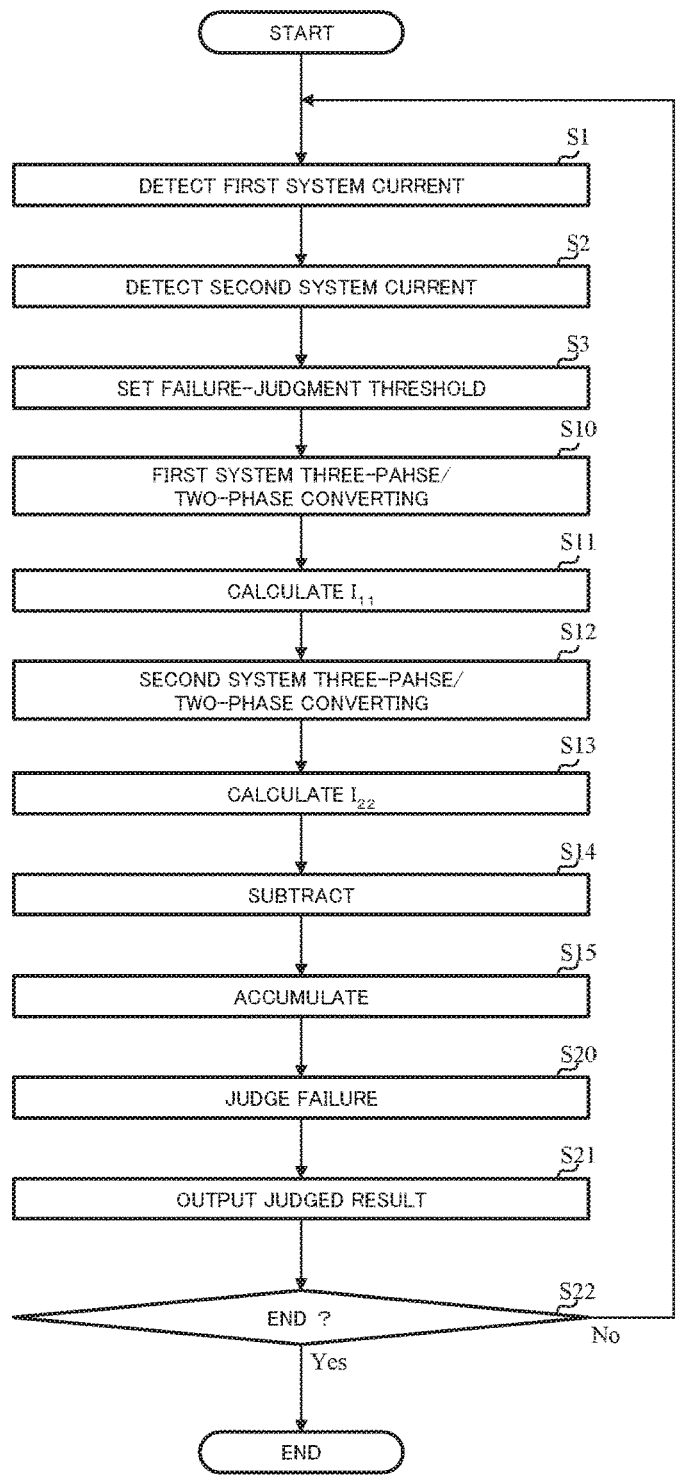
FIG. 8 is a flowchart showing an operating example (the first embodiment) of the present invention.

In such the configuration, an operating example will be described with reference to a flowchart of FIG. 8.

Figure 9:
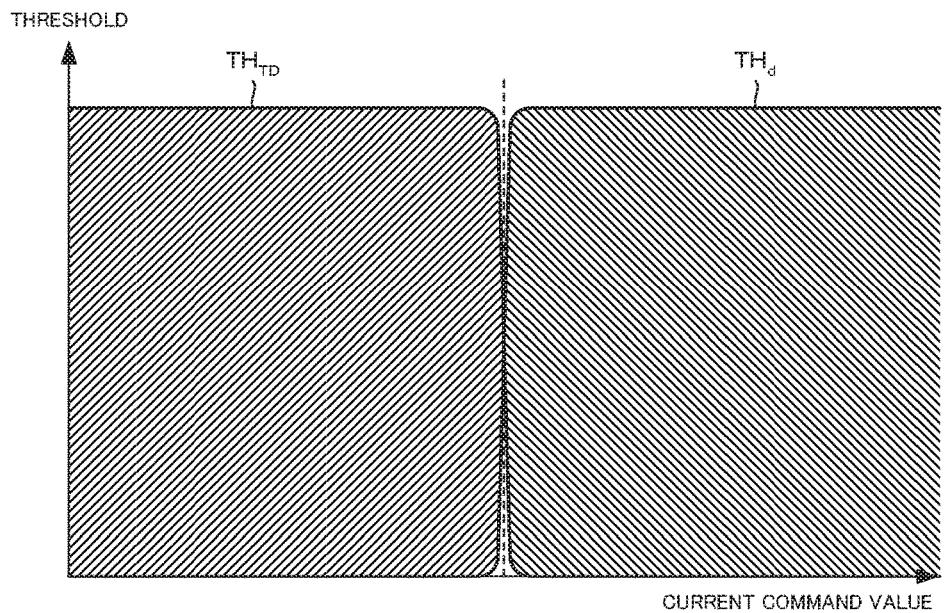
FIG. 9 is a characteristic diagram showing a characteristic example to set a threshold based on a current command value.

The current detecting circuit 121A detects the three-phase currents Iu1, Iv1 and Iw1 of the first system and inputs the detected currents Iu1, Iv1 and Iw1 into the control calculating section 110 (Step S1), and the current detecting circuit 121B detects the three-phase currents Iu2, Iv2 and Iw2 of the second system and inputs the detected currents Iu2, Iv2 and Iw2 into the control calculating section 110 (Step S2). The failure-judgment threshold setting section 310 sets the failure-judgment thresholds $TH_d$ and $TH_{TD}$, which have characteristics as shown in FIG. 9, based on the current command value. As well, the order of these steps is optionally changeable.

The three-phase currents Iu1, Iv1 and Iw1 of the first system are converted to the two-phase currents $I_{\alpha 1}$ and $I_{\beta 1}$ of the α-β coordinate system at rest at the three-phase/two-phase converting section 320 (Step S10), the two-phase currents $I_{\alpha 1}$ and $I_{\beta 1}$ are adding-calculated at the current calculating section 321, and then the current $I_{11}$ is obtained (Step S11). The current $I_{11}$ is adding-inputted into the subtracting section 301. Similarly, the three-phase currents Iu2, Iv2 and Iw2 of the second system are converted to the two-phase currents $I_{\alpha 2}$ and $I_{\beta 2}$ of the α-β coordinate system at rest at the three-phase/two-phase converting section 330 (Step S12), the two-phase currents $I_{\alpha 2}$ and $I_{\beta 2}$ are adding-calculated at the current calculating section 331, and then the current $I_{22}$ is obtained (Step S13). The current $I_{22}$ is subtracting-inputted into the subtracting section 301. The order of these steps is also changeable optionally.

Next, the subtracting section 301 calculates the subtracted value $D_f$ by subtracting the current $I_{22}$ calculated at the above Step S13 from the current $I_{11}$ calculated at the above Step S11 (Step S14), and the accumulating section 302 accumulates the subtracted value $D_f$ (Step S15). The subtracted value $D_f$ is inputted into the failure judging section 350 and is compared with the failure-judgment threshold $TH_d$ (Step S20), and the failure judging section 350 judges the failure in a case that the subtracted value $D_f$ is the failure-judgment threshold $TH_d$ or more and then outputs the failure detecting signal DS (Step S21). Further, the accumulated value $TD_f$ is also inputted into the failure judging section 350 and is compared with the failure-judgment threshold $TH_{TD}$ (Step S20), and the failure judging section 350 judges the failure in a case that the accumulated value $TD_f$ is the failure-judgment threshold $TH_{TD}$ or more and then outputs the failure detecting signal DS (Step S21). The failure detecting signal DS includes the abnormal judging signals SAa and SAb. The operations of the inverters 122A and 122B are stopped and the power supply shut-off circuits 130A and 130B are blocked, depending on the state of the failure detecting signal DS.

The above operations are repeated until judging the end (Step S22).

Although the adding-calculation of the two-phase currents is performed at the above current calculating sections 321 and 331, a subtracting-calculation of the two-phase currents may be performed (the second embodiment). However, the adding-calculation is basically better.

Figure 10:
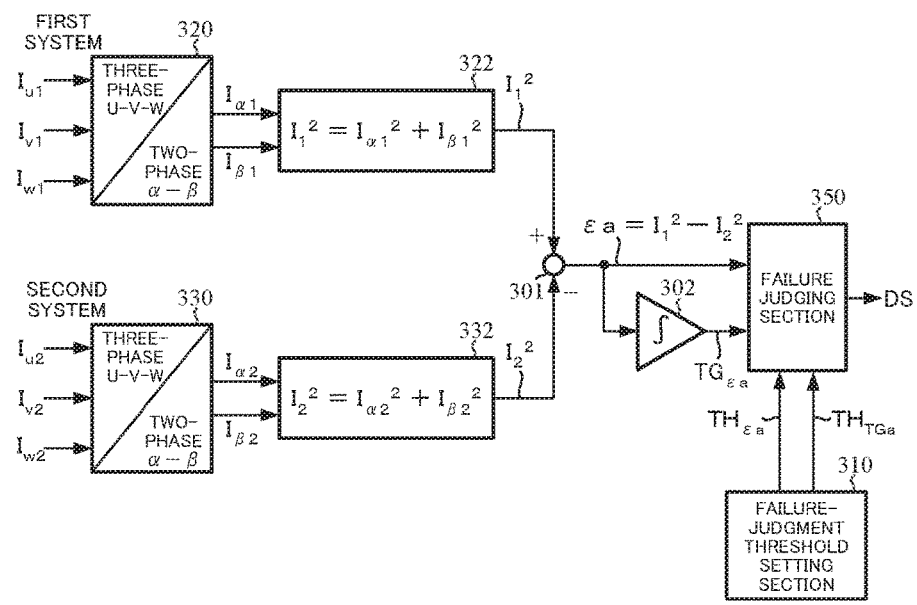
FIG. 10 is a block diagram showing a structure example (the third embodiment) of the motor control unit according to the present invention.

Next, another embodiment (the third embodiment) of the failure diagnosing section 300 will be described. In the third embodiment as shown in FIG. 10 corresponding to FIG. 7, current-calculations for the respective square-sums of the two-phase currents $I_{\alpha 1}$ and $I_{\beta 1}$ of the first system and those $I_{\alpha 2}$ and $I_{\beta 2}$ of the second system are performed, as an alternative for the addition or the subtraction of the two phase currents $I_{\alpha 1}$ and $I_{\beta 1}$ of the first system and those $I_{\alpha 2}$ and $I_{\beta 2}$ of the second system.

That is, the two-phase currents $I_{\alpha 1}$ and $I_{\beta 1}$ of the first system are inputted into the current square-sum calculating section 322, and the square-sum current $I_1^2$ ($=I_{\alpha 1}^2+I_{\beta 1}^2$) is calculated. Similarly, the two-phase currents $I_{\alpha 2}$ and $I_{\beta 2}$ of the second system are inputted into the current square-sum calculating section 332, and the square-sum current $I_2 I^2$ ($=I_{\alpha 2}^2+I_{\beta 2}^2$) is calculated. The square-sum current $I_1^2$ calculated at the current square-sum calculating section 322 is adding-inputted into the subtracting section 301, and the square-sum current $I_2^2$ calculated at the current square-sum calculating section 332 is subtracting-inputted into the subtracting section 301. The subtracted result εa ($=I_1^2-I_2^2$) at the subtracting section 301 is inputted into the failure judging section 350 and is compared with the failure-judgment threshold $TH_{\varepsilon a}$, and is inputted into the accumulating section 302 and then is accumulated. The accumulated value $TG_{\varepsilon a}$ is inputted into the failure judging section 350 and is compared with the failure-judgment threshold $TH_{TGa}$. Then, the failure detecting signal DS is outputted in a case that the subtracted result εa is the failure-judgment threshold $TH_{\varepsilon a}$ or more, and the failure detecting signal DS is also outputted in a case that the accumulated value $TG_{\varepsilon a}$ is the failure-judgment threshold $TH_{TGa}$ or more.

Further, still another embodiment (the fourth embodiment) of the failure diagnosing section 300 will be described. In the fourth embodiment as shown in FIG. 11 corresponding to FIG. 10, the square root calculating section 323 obtains the square root current $I_1$ ($=\sqrt{(I_{\alpha 1}^2+I_{\beta 1}^2)}$) from the square-sum current $I_1^2$ ($=I_{\alpha 1}^2+I_{\beta 1}^2$) calculated at the current square-sum calculating section 322, and the square root calculating section 333 obtains the square root current $I_2$ ($=\sqrt{(I_{\alpha 2}^2+I_{\beta 2}^2)}$) from the square-sum current $I_2^2$ ($=I_{\alpha 2}^2+I_{\beta 2}^2$) calculated at the current square-sum calculating section 332. Then, the current-calculated square root current $I_1$ is adding-inputted into the subtracting section 301, and the square root current $I_2$ is subtracting-inputted into the subtracting section 301. The subtracted value εb ($=I_1-I_2$) at the subtracting section 301 is inputted into the failure judging section 350 and is compared with the failure-judgment threshold $TH_{\varepsilon b}$, and is inputted into the accumulating section 302 and then is accumulated. The accumulated value $TG_{\varepsilon b}$ is inputted into the failure judging section 350 and is compared with the failure-judgment threshold $TH_{TGb}$. Then, the failure detecting signal DS is outputted in a case that the subtracted value εb is the failure-judgment threshold $TH_{\varepsilon b}$ or more, and the failure detecting signal DS is also outputted in a case that the accumulated value $TG_{\varepsilon b}$ is the failure-judgment threshold $TH_{TGb}$ or more.

FIGS. 12A and 12B are timing-charts showing an operating example in a case that a primary failure occurs at a time t=0.1 [sec] and a secondary failure occurs at a time t=0.2 [sec] on a condition of a high speed steering and a high assist force. FIG. 12A shows the difference of the square root currents of the square-sum for the two-phase currents (εb in FIG. 11), and FIG. 12B shows the accumulated value of the difference ($TG_{\varepsilon b}$ in FIG. 11). From these figures, since the difference between the first system and the second system increases, it is understood that the primary failure of the layer short-circuit can be detected. Further, the primary failure can also be detected from the accumulated value of the difference.

FIGS. 13A and 13B are timing-charts showing an operating example in a case that the primary failure occurs at a time t=0.1 [sec] and the secondary failure occurs at a time t=0.2 [sec] on a condition of a low speed steering and a low assist force. FIG. 13A shows the difference of the square root currents of the square-sum for the two-phase currents (εb in FIG. 11), and FIG. 13B shows the accumulated value of the difference ($TG_{\varepsilon b}$ in FIG. 11). From these figures, since the difference between the first system and the second system is small, it is understood that the detection of the primary failure of the layer short-circuit is difficult. On the other hand, because the accumulated value of the difference monotonically increases and necessarily becomes equal to or larger than the threshold after a certain time, it is understood that the failure detection is possible.

Although the three-phase motor with the dual-system windings is described in the above embodiments (the first embodiment to the fourth embodiment), it is possible to similarly apply to a motor with the multi-system motor windings more than three systems.

Although the current-calculation due to the three-phase/two-phase current conversion is performed in the above embodiments, a current-calculation due to the two-phase currents as shown in FIG. 14 (the fifth embodiment) may be applied. That is, a square-sum $I_1^2 = I_{u1}^2 + I_{v1}^2 + I_{w1}^2$ of the three-phase currents $I_{u1}$, $I_{v1}$ and $I_{w1}$ of the first system is calculated at the current square-sum calculating section 324, a square-sum $I_2^2 = I_{u2}^2 + I_{v2}^2 + I_{w2}^2$ of the three-phase currents $I_{u2}$, $I_{v2}$ and $I_{w2}$ of the second system is calculated at the current square-sum calculating section 334, and the difference εa between the square-sums $I_1^2$ and $I_2^2$ is obtained at the subtracting section 301. In this case, when the steering speed is high (the motor rotational speed is high) or the assist force is large (the motor phase current is large), the failure judging section 350 judges the failure whether the difference εa between the first system and the second system is larger than the threshold $TH_{εa}$ or not. Further, when the steering speed is low (the motor rotational speed is low) or the assist force is small (the motor phase current is small), the failure judging section 350 judges the failure whether the integral value TGεa of the difference εa between the first system and the second system is larger than the threshold $TH_{Tεa}$ or not.

Although the square-sum of the three-phase currents is calculated in the fifth embodiment, it may be the square-sum of currents (arbitrary two phases) for at least two-phase or more.

Figure 15:
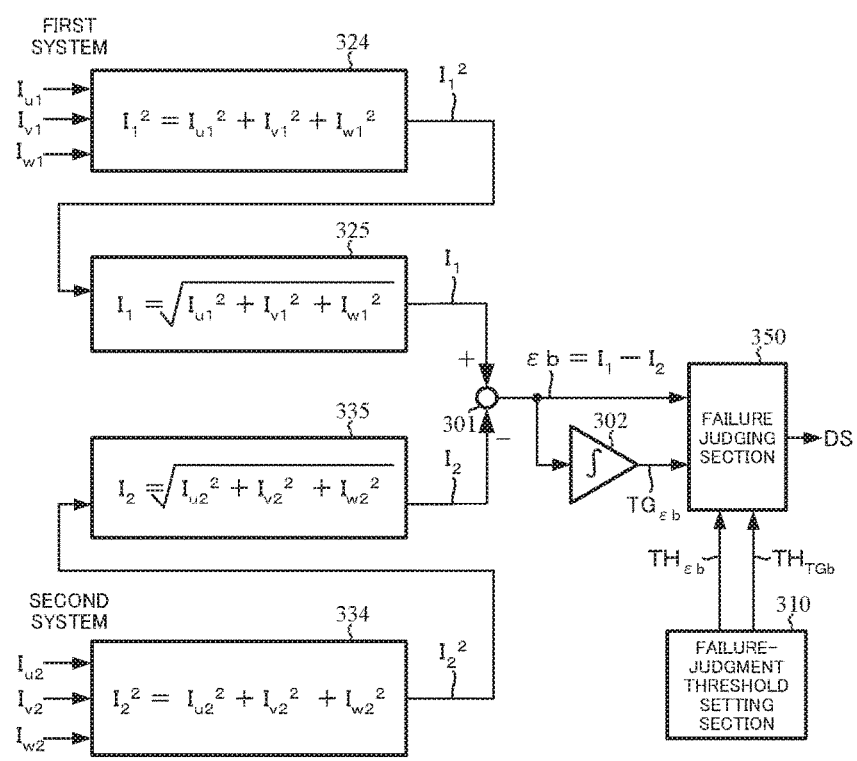
FIG. 15 is a block diagram showing a structure example (the sixth embodiment) of the motor control unit according to the present invention.

Further, in the sixth embodiment shown in FIG. 15, the square roots $I_1$ and $I_2$ are calculated at the square root sections 325 and 335 from the outputs $I_1^2$ and $I_2^2$ of the current square-sum calculating sections 324 and 334, and the difference εb between the square roots $I_1$ and $I_2$ is obtained at the subtracting section 301. Also in this case, when the steering speed is high (the motor rotational speed is high) or the assist force is large (the motor phase current is large), the failure judging section 350 judges the failure whether the difference εb between the first system and the second system is larger than the threshold $TH_{εb}$ or not. Further, when the steering speed is low (the motor rotational speed is low) or the assist force is small (the motor phase current is small), the failure judging section 350 judges the failure whether the integral value $TG_{εb}$ of the difference εb between the first system and the second system is larger than the threshold $TH_{Tεb}$ or not.

Although the square-sum of the three-phase currents is calculated in the sixth embodiment, it also may calculate the square-sums of the currents (arbitrary two phases) for at least two-phase or more and then obtain the square roots thereof.

Figure 16:
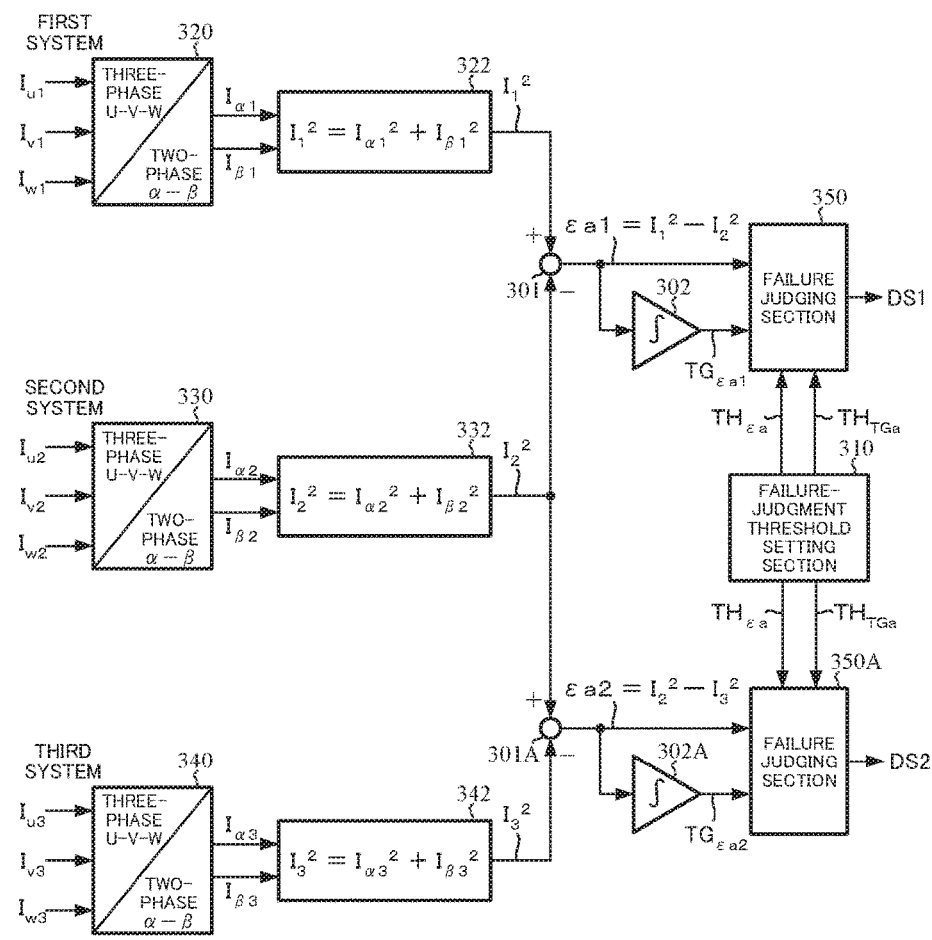
FIG. 16 is a block diagram showing a structure example (the seventh embodiment) of the motor control unit according to the present invention.

FIG. 16 shows one example of performing the failure diagnosing in a motor with triple-system windings. The example of FIG. 16 shows the current square-sum of corresponding to FIG. 10, is current-calculated and compares in the first and second systems, and is further current-calculated and compares in the second and third systems. That is, in addition to the current-calculation and the comparison for the first system and the second system as shown in FIG. 10, the present seventh embodiment converts the three-phase currents $I_{u3}$, $I_{v3}$ and $I_{w3}$ of the third system to the two-phase currents $I_{α3}$ and $I_{β3}$ of the α-β coordinate system at rest, which are orthogonal each other, at the three-phase/two-phase converting section 340. The converted two-phase currents $I_{ε3}$ and $I_{β3}$ are inputted into the current square-sum calculating section 342, and the square-sum current $I_3^2$ ($=I_{α3}^2 + I_{β3}^2$) is obtained. The calculated square-sum current $I_3^2$ is subtracting-inputted into the subtracting section 301A, and the square-sum current $I_2^2$ calculated at the current square-sum calculating section 332 is adding-inputted into the subtracting section 301A. The subtracted value εa2 ($=I_2^2 - I_3^2$) at the subtracting section 301A is inputted into the failure judging section 350A and is compared with the failure-judgment threshold $TH_{εa}$, and is inputted into the accumulating section 302A and then is accumulated. Further, the accumulated value $TG_{ε2}$ is inputted into the failure judging section 350A and is compared with the failure-judgment threshold $TH_{TGa}$. The failure detecting signal DS is outputted in a case that the subtracted value εa2 is the failure-judgment threshold $TH_{εa}$ or more, and the failure detecting signal DS is also outputted in a case that the accumulated value $TG_{εa2}$ is the failure-judgment threshold $TH_{TGa}$ or more.

Although the difference and the accumulated value thereof for the first system and the second system and the difference and the accumulated value thereof for the second system and the third system are compared with the respective failure-judgment thresholds and then are judged the failure in the above seventh embodiment, it may add a configuration that the difference and the accumulated value for the third system and the first system are compared with the failure thresholds and are judged. Any of the first to fourth embodiments may be used with respect to the current-calculation. The calculating process may be used to the three-phase currents in which the three-phase/two-phase converting is not performed. Further, the calculating process can be applied to the quadruple or more-system motor.

EXPLANATION OF REFERENCE NUMERALS 1 handle
2 column shaft (steering shaft, handle shaft)
10 torque sensor
12 vehicle speed sensor
14 steering angle sensor
20 motor
30 control unit (ECU)
100 motor control unit
101 rotational position sensor
103 battery
110 control calculating section (ECU)
120A, 120B motor driving circuit
121A, 121B current detecting circuit
122A, 122B inverter
123A, 123B gate driving circuit
124A, 124B power supply shut-off circuit
130A, 130B motor current shut-off circuit
200 dual-system winding motor (three-phase motor)
300 failure diagnosing section
302, 302A accumulating section
310 failure-judgment threshold setting section
320, 330, 340 three-phase/two-phase converting section
321, 331 current calculating section
322, 332, 342 current square-sum calculating section
323, 333 square root calculating section
350, 350A failure judging section

The invention claimed is:

1. A motor control unit that controls a three-phase motor with multi-system motor windings via motor driving circuits for respective winding systems based on a current command value, comprising:
current detecting circuits to detect at least two-phase or more currents for respective said multi-system motor windings of said three-phase motor;
three-phase/two-phase converting sections to convert said detected three-phase currents detected by said current detecting circuits to two-phase currents for respective said multi-system motor windings; and
a failure diagnosing section to perform a current-calculation of said two-phase currents converted to two-phases by said three-phase/two-phase converting sections for respective said multi-system motor windings, and to perform a failure diagnosis by respectively comparing a difference of current-calculated results between said multi-system motor windings and an accumulated value of said difference with respective failure-judgment thresholds;
wherein said failure-judgment thresholds are determined based on said current command value,
wherein in a case that said failure diagnosing section detects a failure, said failure diagnosing section judges a deviation in a continuous-driving capable value based on said failure-judgment thresholds and transmits a quantity of said deviation to a superior system or a superior controller so that drivings in multi-systems which include a failure system are successively continued.

2. The motor control unit according to claim 1, wherein said current-calculation is an addition or a subtraction for said two-phase currents.

3. The motor control unit according to claim 1, wherein said current-calculation is a square-sum for said two-phase currents.

4. The motor control unit according to claim 1, wherein said current-calculation is a square root of a square-sum for said two-phase currents.

5. A motor control unit that controls a three-phase motor with multi-system motor windings via motor driving circuits for respective winding systems based on a current command value, comprising:
current detecting circuits to detect at least two-phase or more currents for respective said multi-system motor windings of said three-phase motor; and
a failure diagnosing section to perform a current-calculation of said three-phase currents detected by said current detecting circuits for respective said multi-system motor windings, and to perform a failure diagnosis by respectively comparing a difference of current-calculated results between said multi-system motor windings and an accumulated value of said difference with respective failure-judgment thresholds;
wherein said failure-judgment thresholds are determined based on said current command value,
wherein in a case that said failure diagnosing section detects a failure, said failure diagnosing section judges a deviation in a continuous-driving capable value based on said failure-judgment thresholds and transmits a quantity of said deviation to a superior system or a superior controller so that drivings in multi-systems which include a failure system are successively continued.

6. The motor control unit according to claim 5, wherein said current-calculation is a square-sum for said three-phase currents.

7. The motor control unit according to claim 5, wherein said current-calculation is a square root of a square-sum for said three-phase currents.

8. A motor control unit that controls a three-phase motor with multi-system motor windings via motor driving circuits for respective winding systems based on a current command value, comprising:
current detecting circuits to detect at least two-phase or more currents for respective said multi-system motor windings of said three-phase motor;
three-phase/two-phase converting sections to convert said detected three-phase currents detected by said current detecting circuits to two-phase currents for respective said multi-system motor windings; and
a failure diagnosing section to perform a current-calculation of said two-phase currents converted to two-phases by said three-phase/two-phase converting sections for respective said multi-system motor windings, and to perform a failure diagnosis by respectively comparing a difference of current-calculated results between said multi-system motor windings and an accumulated value of said difference with respective failure-judgment thresholds;
wherein said failure-judgment thresholds are determined based on said current command value,
wherein in a case that said failure diagnosing section detects a failure, said failure diagnosing section transmits said failure detection to a superior system or a superior controller and switches-OFF driving of a failure system so that only normal systems are continuously driven.

9. A motor control unit that controls a three-phase motor with multi-system motor windings via motor driving circuits for respective winding systems based on a current command value, comprising:
current detecting circuits to detect at least two-phase or more currents for respective said multi-system motor windings of said three-phase motor; and
a failure diagnosing section to perform a current-calculation of said three-phase currents detected by said current detecting circuits for respective said multi-system motor windings, and to perform a failure diagnosis by respectively comparing a difference of current-calculated results between said multi-system motor windings and an accumulated value of said difference with respective failure-judgment thresholds;
wherein said failure-judgment thresholds are determined based on said current command value,
wherein in a case that said failure diagnosing section detects a failure, said failure diagnosing section transmits said failure detection to a superior system or a superior controller and switches-OFF driving of a failure system so that only normal systems are continuously driven.

10. An electric power steering apparatus is equipped with the motor control unit according to claim 1, and applies an assist force to a steering system of a vehicle due to a current command value calculated based on at least steering torque.

11. A vehicle is equipped with the electric power steering apparatus according to claim 10.

* * * * *